United States Patent [19]

Liebert et al.

[11] Patent Number: 4,618,017
[45] Date of Patent: Oct. 21, 1986

[54] HYDRAULIC AUXILIARY POWER STEERING FOR MOTOR VEHICLES

[75] Inventors: Karl-Heinz Liebert; Erwin Wiedemann, both of Schwäbisch Gmünd, Fed. Rep. of Germany

[73] Assignee: Zahnradfabrik Friedrichshafen, AG., Friedrichshafen, Fed. Rep. of Germany

[21] Appl. No.: 676,394

[22] PCT Filed: Nov. 15, 1983

[86] PCT No.: PCT/EP83/00301

§ 371 Date: Nov. 21, 1984

§ 102(e) Date: Nov. 21, 1984

[87] PCT Pub. No.: WO84/03674

PCT Pub. Date: Sep. 27, 1984

[30] Foreign Application Priority Data

Mar. 23, 1983 [WO] PCT Int'l Appl. ............ EP83/00088

[51] Int. Cl.$^4$ ................................................ B62D 5/08
[52] U.S. Cl. ...................................... 180/133; 180/132; 180/143
[58] Field of Search ................. 180/133, 132, 141, 143

[56] References Cited

U.S. PATENT DOCUMENTS

| | | | |
|---|---|---|---|
| 3,246,472 | 4/1966 | Kries | 180/132 |
| 3,784,328 | 1/1974 | Pedersen | 417/222 |
| 4,184,560 | 1/1980 | Tischer | 180/133 |
| 4,204,584 | 5/1980 | deMaight | 180/133 |
| 4,237,993 | 12/1980 | Jablonsky | 180/133 |
| 4,293,051 | 10/1981 | Nishikawa | 180/133 |
| 4,557,342 | 12/1985 | Drutchas | 180/132 |

Primary Examiner—John J. Love
Assistant Examiner—Donn McGiehan
Attorney, Agent, or Firm—Zalkind & Shuster

[57] ABSTRACT

A booster steering system has two pressure pumps for the booster cylinder, one of which is driven by the vehicle, with the wheels when the vehicle is rolling, and the other pump is driven by the vehicle engine. The vehicle driven pump is an emergency pump of non-variable displacement and can provide booster pressure flow to steer a vehicle off the road in an emergency should the engine driven pump fail. The engine driven pump is of variable displacement, normally maintained by an actuating means at zero stroke responsive to a pilot pressure from a steering control valve in neutral position with no steering pressure output. The vehicle driven pump normally provides the pressure output for steering. Accordingly, since most of the time the engine driven pump operates virtually pressurelessly there is no energy loss. When the vehicle is moving slowly in a tight curve a greater volume of output to the booster cylinder is needed and is provided by the engine driven variable displacement pump. By operation of the steering control valve there occurs a differential pressure on the actuating means of the variable displacement pump to effect a pumping stroke. Upon no further need after the steering is completed, an opposite differential pressure is effected with the steering control valve back to neutral position which restores the zero stroke condition. Further, should the engine driven pump output fail, the vehicle driven emergency pump will provide a booster pressure output to at least steer the moving vehicle out of traffic.

6 Claims, 2 Drawing Figures

HYDRAULIC AUXILIARY POWER STEERING FOR MOTOR VEHICLES

BACKGROUND OF THE INVENTION

An auxiliary power boost steering system having an emergency pump which operates with a first and a second pump has been known, for example, in the German Pat. No. 27 31 975 (U.S. Pat. No. 4,237,993). A two-pump operation is always desirable since at times heavy trucks become unsteerable because of the failure of the engine driven first pump. In this case, a vehicle may be safely pulled out of traffic while the vehicle is rolling, for example, with the second pump (emergency steering pump) driven by the gearing in vehicle movement. The known auxiliary power steering arrangement shows a so-called emergency valve which, in the case of a defect of the engine driven first pump, separates the latter from the hydraulic steering circuit and connects in the emergency steering pump. Whenever the engine driven first pump is fully operational, the emergency steering pump in the standby mode circulates a volume of oil with a certain idling pressure required for the maintenance of the hydraulic circuit. Since a failure of the engine driven first pump occurs only very rarely during operation time of a vehicle, the continuing standby operation of the vehicle driven emergency steering pump means a steady loss of power.

BRIEF DESCRIPTION OF THE INVENTION

According to the invention, the engine driven pump is a variable displacement adjustable output pump, but the emergency steering pump is vehicle driven by a shaft or axle of the vehicle. A steering flow control valve has, in the neutral position, a construction so that output flow of the emergency steering pump regulates the variable displacement engine driven pump. Moreover, for the regulation of the variable displacement pump, a comparator valve connected between the pressure line connections to the booster cylinder has been provided connecting the effective pressure side of the booster cylinder with the pressure operated actuator of the variable displacement pump to set the extent of the stroke. At a low speed of travel, the emergency steering pump has an output flow sufficient for slow steering movements for usual steering in the directions of travel. In this case, the opened area of the inlet flow control gaps of a slidable steering control valve effect pressures for the actuator means of the variable displacement pump for zero stroke. Thus, when the vehicle travels at medium or higher speeds, in the normal operating range of the auxiliary power steering, the vehicle driven emergency steering pump supplies booster oil for steering purposes while the variable displacement pump remains in zero stroke position thereby absorbing no engine power, and being in a standby mode.

The vehicle driven emergency steering pump is the main pump relied on for steering at or above a predetermined vehicle speed, e.g., 10 KM/h. However, the term "emergency" is used to indicate that if the variable displacement pump flow fails when needed, the vehicle driven pump can at least provide pressure flow to steer the vehicle off the road.

However, for low speeds of travel, e.g., in sharp curves, the flow required in the booster cylinder can no longer be produced by the slowed speed of the vehicle driven steering pump alone. Due to the wide opening of an inlet valving gap, the control edges 12 or 13, respectively, the pressure difference decreases toward zero. As a result of the small or no pressure difference in the control lines 26 and 28, an actuator means swashplate is acted on by a spring force in the direction of increased volume discharge. The variable displacement pump therefore provides a pressure flow of oil whenever the travel conditions require supplemental feed to the booster cylinder. When the pressure in a chamber of the booster cylinder rises, such pressure chamber being connected through a comparator valve with the actuator means regulates the stroke of the pump to provide additional flow. Of course, should that pump fail, e.g., due to engine trouble or other reason, the vehicle driven emergency pump can at least function to steer the vehicle out of traffic just so long as the vehicle is moving.

The variable displacement pump driven by the motor of the vehicle supplies the necessary output flow for a stationary vehicle or in event of very low speed of travel. This occurs when the vehicle driven pump, dependent on the speed of the vehicle, may not be capable of supplying any or any sufficiently large flow. This causes a pressure decrease in the booster cylinder, thus to effect output of the variable displacement pump.

Suitable design of the grooves and lands of the steering control valve effects opening and closing of flow control gaps proportionally to ensure a smooth regulation of the variable displacement pump for a continuous output flow, when needed.

The arrangement described has the advantage that both pumps are used only when needed. The variable displacement pump operates only to supplement peak requirements or when the vehicle is standing still, and may be small in size. In contrast, the prior art supplemental flow pumps run constantly and waste energy; standby zero stroke operation saves energy in the present invention. It is thus possible to supervise continuous readiness for operation or condition of wear of the vehicle driven steering pump for pressure and quantity by instruments. Further, the invention is constructed simply as compared to the prior art and requires fewer components in addition to power saving in operation of heavy vehicles requiring large hydraulic flow steering.

The arrangement provides for return to zero stroke position of the variable displacement pump as the booster cylinder pressure increases to full operational status.

A detailed description of the invention now follows in conjunction with the appended drawing wherein.

Figure 1:
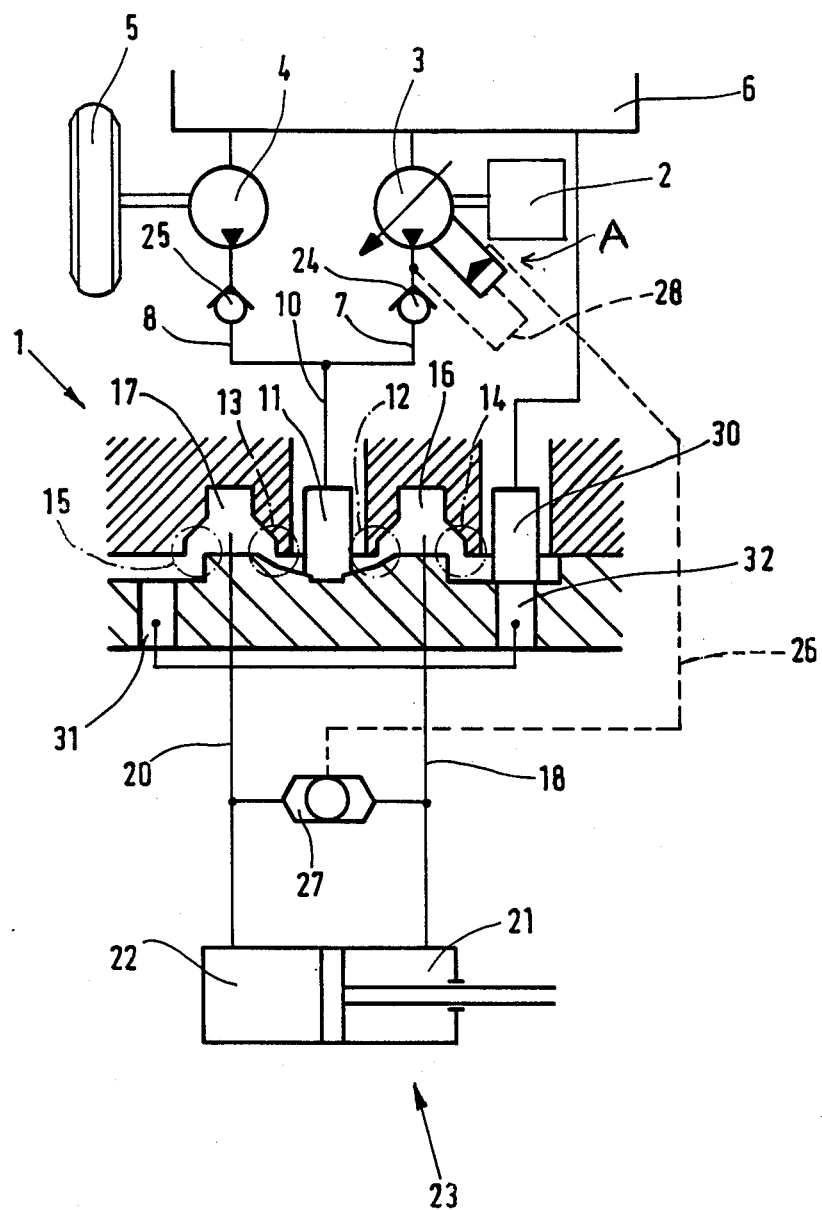
FIG. 1 shows a diagrammatic view of the hydraulic circuity of an auxiliary power steering with a simplified partial cut through a steering control valve.
Figure 2:
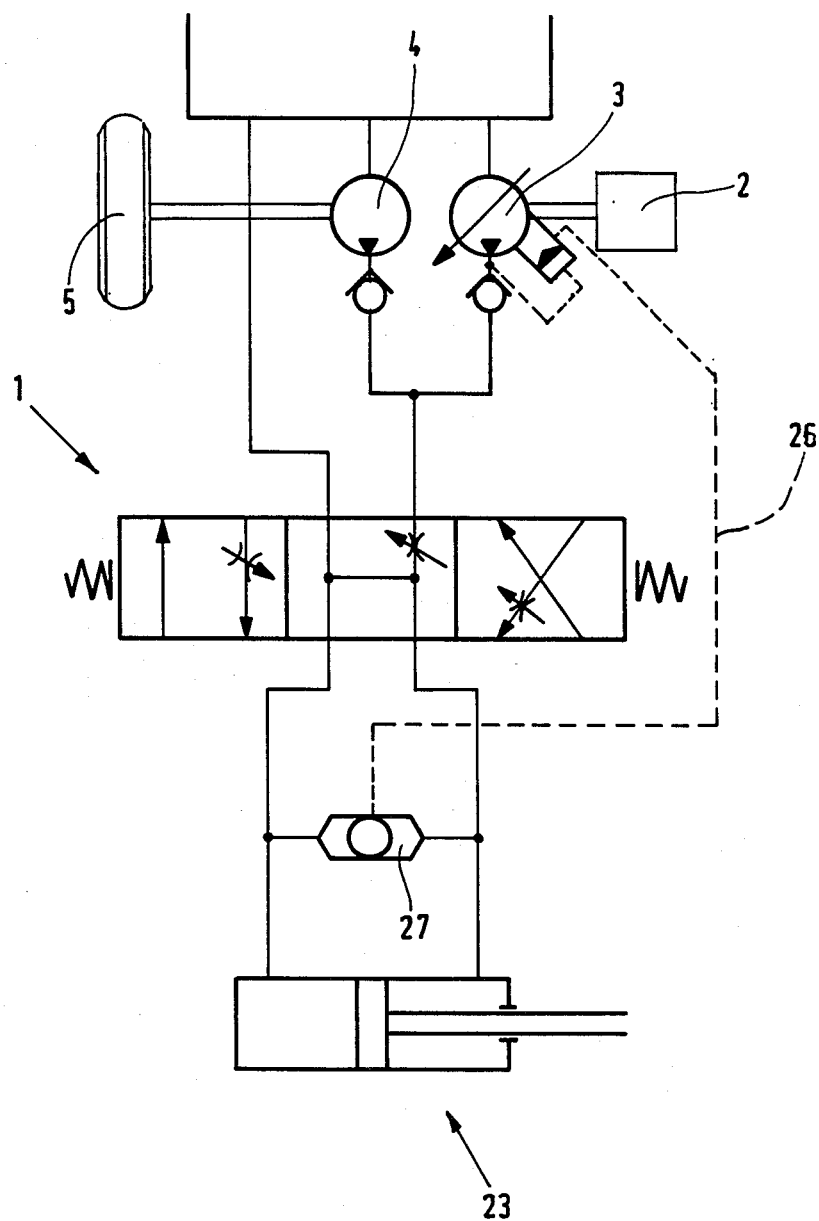
FIG. 2 shows a diagrammatic view of the hydraulic circuitry according to FIG. 1 but with symbolic presentations of the steering control valve.

In FIG. 1, a hand steering wheel, now shown, is connected with a steering control valve 1, for example, an axial sliding valve, in a known manner synchronizable by the steering movement. A first pump 3 driven by the vehicle engine 2 and a second pump 4 driven by vehicle movement, are connected to the steering control valve 1. The second pump 4, subsequently also referred to as emergency steering pump, is coupled with a gear shaft or, as indicated by the wheel 5, with an axle drive and supplies a constant flow of oil or a flow of oil rising linearly with the speed of travel. Both pumps 3 and 4 draw pressure oil from a tank 6 and convey it by line branches 7 and 8 and a common pressure line 10 into an inlet groove 11 of the steering control valve 1. In the neutral position of the steering control valve 1, as shown, the inlet groove 11 communicates via open inlet control edges 12, 13 and open return control edges 14, 15 with the tank 6. Connections to tank are omitted for simplicity, it being understood that in neutral position the system is open circuit. Between the inlet and return control edges are cylinder feed grooves 16, 17 which are connected with pressure chambers 21, 22 of a booster cylinder 23 via cylinder lines 18,20. In the line branches 7 and 8, non-return vllves 24 or 25 are disposed, respectively, the function of which will be explained in more detail later on.

According to the invention, the engine driven pump 3 is constructed as a variable stroke displacement pump. Variable displacement pump delivers steering flow responsive to a control signal, e.g., a pressure change, when additional flow is needed for operation of an actuator means A which changes the extent of pumping stroke of the variable displacement pump from zero to some setting that produces needed output flow.

This occurs when the vehicle driven pump 4 is unable to fill a pressure chamber 21 or 22 because the vehicle is not moving or is executing a sharp turn at slow speed.

The engine driven pump may be of the kind shown in U.S. Patent to Pedersen, 3,748,329, which has variable output from zero, when no additional pressure flow is needed, to some value of output as required when an additional flow is needed. Thus, by virtue of a pressure differential acting on an actuating means A of pump 3 caused by a need for additional pressure flow, the normal zero output of that pump is changed to contribute additional flow.

At the end of such steering operation, no additional output being needed, the variable pump is restored to zero stroke operation by pilot pressure operated actuator means acting against the force of a spring (for example, in U.S. Pat. 3,748,329 the piston 28 and spring 30). The losses then are only leakage of the system balanced out and the pilot pressure (standby pressure) is kept constant for zero stroke. Features concerning the construction and the mode of operation of such variable displacement pumps are also shown in a counterpart patent, German Pat. No. 23 22 890. The engine operated pump 3,viz., variable displacement pump 3, is connected by a control line 26 with a comparator valve 27 which is connected between the two cylinder lines 18 and 20, thus connecting the pressurized chamber 21 or 22 of the booster cylinder 23 with the stroke controlling actuator means of the variable displacement pump to so initiate a pumping action.

The flow control areas at the inlet lands and grooves effected by flow control edges 12 and 13 of the steering control valve 1, are areas through which, in the neutral position shown, a control pressure is created in the lines 7, 8 and 10 effected by the emergency steering vehicle driven pump 4. This control pressure for the variable displacement actuator means is predetermined so that between the line 10 and the control line 26, a pressure differential of about 12 to 15 bar occurs, which acts as a control force on the actuator means that varies the pumping stroke. The pumping stroke of the variable displacement pump 3 is adjusted so that the output booster flow maintains that pressure differential at 12 to 15 bar. By way of the control line 26 and an additional control line 28, it can be mentioned that the pressure difference serves as control pressure for the regulation of the conveying volume of the variable displacement pump 3. The control lines 26 and 28 are connected in a known manner to operate the pistons that control the angle of the swashplate to vary the volume displacement of pump 3. For example, pistons 28 and 56 in U.S. Pat. 3,784,328. to Pedersen on both sides of swashplate 22, wherein the lines 4' and 50 correspond to lines 28 and 26, respectively, of applicants' invention.

In the neutral position of the steering valve 6 therefore the emergency steering pump delivers a pilot stream which, after passing the constricted opening cross section of the inlet control edges 12, 13 can flow out by way of the return control edges 14, 15 and a return groove 30 to the container 6.

In one steering position, the emergency steering pump 4 is capable of providing of itself in the normal operating range of the auxiliary power steering, the required booster flow as long as the control pressure lies above the mentioned 12 to 15 bar. If however, at relatively low speeds of travel, tight curves are travelled with rapid steering the control pressure drops due to the high requirement for booster flow. In order to meet this high requirement the output of the variable displacement pump 3 added.

OPERATION OF VARIABLE DISPLACEMENT PUMP

Assume the vehicle driven pump 4 is not operating or is operating too slowly to expeditiously fill the pressure chambers at a high steering speed.

If the land section (wider hatching) of steering valve 1 is shifted, e.g., to the right at this time the opening cross section of the inlet flow gap 12 is enlarged with simultaneous constrictions of the area at the return flow control gap 14. At this time, a pressure drop between the inlet groove 11 and the cylinder groove 16 becomes less. Line 26 is always open to the interior of the comparator valve 27; groove 16 connects to line 18 to the comparator valve as well as to pressure chamber 21. Accordingly, the pressure difference between the line 10 and the control line 26 is lower. This pressure drop is a control signal to the actuator means A of variable displacement pump 3 by way of the line branch 7 and the control line 28 on the one hand, as well as by way of the line 18, the comparator valve 27 and the control line 26, on the other hand. The actuating means swashplate (22 in Pedersen) is acted on by a spring (30 in Pedersen) to increase volume discharge. The variable displacement pump 3 together with the emergency steering pump 4 now deliver a booster flow via the increased area of gap 12 and the cylinder line 18 into the pressure chamber 21 to fill the momentary increased need for oil flow. However, during filling, the pressure in the pressure chamber 21 increases and need for increased booster flow decreases, at the end of a steering operation. This causes an increase of the pressure difference between lines 10 and 26 which is transferred to the variable displacement pump 3 via control line 28, comparator valve 27, control line 26 to the actuating means A of variable displacement pump 3. Depending on the level of the pressure, the actuator means of the variable displacement pump is thus motivated to a smaller output volume back to the zero stroke position. The return oil from pressure chamber 22 then flows to the tank 6 via the cylinder line 20, the cylinder groove 17, the wide flow area at gap 15, a bore 31, another bore 32 and by way of the return groove 30.

When a vehicle is stationary, booster flow required for steering is from the variable displacement pump 3 alone. The check or non-return valve 25 is inserted into the line 8 to prevent loss by flow of oil from pump 3 through the emergency steering pump 4.

In case of a sudden failure of the variable displacement pump 3 during travel, the check or non-return valve 24 is inserted into the line branch 7 and prevents loss of oil through that pump. In such case, the emergency steering pump 4 serves for emergency steering to move the vehicle out of traffic.

In retrospect, when making tight turns at low speeds a shift of control valve 1 (the wider hatched section as shown in FIG. 1) to the right, opens gap 12 to a greater extent than shown while closing gap 13 thus causing the pressurizing of chamber 21 and exhaust of chamber 22. However, the need for filling the volume of chamber 21 results in a drop of the pilot pressure which maintained pump 3 in zero stroke condition with no output. Thus, there is a drop in pressure differential between control lines 10 and 26 effective to cause actuator means A to permit tilt of a swashplate therein by virtue of a spring acting thereon. In other words, as viewed in Pedersen U.S. Pat. No. 3,784,328, the drop in differential pressure between the lines 58 and 40 results in a pump 3 discharge as will be apparent. Such discharge in combination with the discharge of pump 4, or without pump 4 if the vehicle is stationary, serves to fill up chamber 21 thereby building up the pressure therein. This produces a shift of the comparator valve 27 and pressure from chamber 21 acts in line 26 causing a rise in differential pressure between lines 10 and 26. Such rise in pressure differential is conducted via line 28 and comparator valve 27 as well as control line 26 to the actuator means A rendering it once more conditioned to restore zero stroke operation of pump 3.

What is claimed is:

1. In a dual pump booster open circuit system having a double acting booster cylinder (23) with a pair of pressure chambers (21, 22) and comprising a vehicle driven pump (4) operating responsive to vehicle speed for providing pressure flow for booster steering; and an engine driven standby pump (3); including a manually operable steering control valve (1) through which discharge passes in neutral position to a sump:

the improvement which comprises:

said engine driven pump being a variable displacement pump and having pressure operable actuating means (A) movable in opposite directions to vary output from zero output to a volume and pressure suitable for booster steering operation and return to zero output;

said control valve when in neutral position having a flow restriction means (12, 13) to effect a pilot pressure therethrough to said actuating means from the output of said vehicle driven pump;

hydraulic circuitry means conveying said pilot pressure to said actuating means for normally maintaining zero output of said variable displacement pump during or above a predetermined vehicle speed;

connection means (28) from said variable displacement pump to said actuating means for conveying pressure from said latter pump to said actuating means;

including a comparator valve (27) connected between the pressure chambers of a booster cylinder, said hydraulic circuitry means having connection means (26) to said actuating means effective to communicate pressure thereto from said comparator valve upon a rise or fall in pressure in either pressure chamber;

whereby a drop in pressure to said actuating means from either chamber causes said variable displacement pump to provide a booster steering output at vehicle speeds below said predetermined speed and whereby a rise in pressure to said actuating means from either pressure chamber restores zero output.

2. In a system as set forth in claim 1, said steering control valve comprising relatively shiftable members; said flow restriction means comprising grooves and lands of said shiftable members; said grooves and lands having coacting edges effecting variable pressure flow gaps (12,13) for pressure flow to a respective pressure chamber (21, 22) and also effecting variable flow return gaps (14, 15) for return flow, wherein opening or closing of a pressure flow gap to a respective pressure chamber simultaneously effects proportional closing or opening of the respective return flow gap.

3. In a system as set forth in claim 1, wherein both said pumps (3, 4) have respective connections (7, 8) to a common feed inlet (11) of said steering control valve (1) and a respective check valve (24, 25) in said connections opening in the direction of flow to said feed inlet.

4. In a hydraulic power steering system for motor vehicles of the kind having a vehicle driven pump (4) and an engine driven pump (3) wherein the engine driven pump effects an output to be added to the output of the vehicle driven pump for operating a double acting steering power booster cylinder (23) having a pair of pressure chambers (21, 22) which comprises:

said engine driven pump (3) being a variable displacement pump and having variable actuating means (A) to control output of said latter pump, steering control valve means (1) connected to receive the output from both said vehicle driven pump and said engine driven pump and comprising members effecting a pressure force in neutral position operative on said actuating means to maintain zero output of said engine driven pump when said vehicle driven pump is operating at a speed sufficient to fill either pressure chamber;

pressure force means operative on said actuating means responsive to a decrease of the pressure difference across the steering control valve (1) when said vehicle driven pump (4) is unable to provide sufficient pressure flow to operate the piston of the booster cylinder during a steering operation;

wherein a decrease of the pressure difference across the steering control valve (1) effects a change in said actuating means to effect operation of said engine driven pump above zero output to assist or replace the output of said vehicle driven pump for operating said piston of the booster cylinder thereby effecting a rise in pressure in either said pressure chamber operative on said actuating means to restore zero output responsive to said latter pressure force means.

5. In a system as set forth in claim 4, said steering control valve means comprising relatively shiftable members having grooves and lands with coacting edges effecting variable flow areas (12, 13) for pressure flow to a respective pressure chamber (21, 22) and variable flow return areas (14, 15) for return flow, wherein opening or closing of a pressure flow area to a respective pressure chamber simultaneously effects proportional closing or opening of the respective return flow area.

6. In a system as set forth in claim 4, wherein both said pumps (3, 4) have respective connections (7, 8) to a common feed inlet (11) of said steering control valve means (1) and a respective check valve (24, 25) in said connections opening in the direction of flow in said feed inlet.

* * * * *